United States Patent [19]

Bookbinder et al.

[11] Patent Number: 5,106,938
[45] Date of Patent: Apr. 21, 1992

[54] MELT CRYSTALLINE POLYETHERIMIDES

[75] Inventors: Dana C. Bookbinder, Pittsfield; Edward N. Peters, Lenox, both of Mass.; Donald R. Berdahl, Scotia; Pamela A. Matsch, Schenectady, both of N.Y.

[73] Assignee: General Electric Company, Pittsfield, Mass.

[21] Appl. No.: 363,167

[22] Filed: Jun. 8, 1989

[51] Int. Cl.$^5$ .................. C08G 63/00; C08G 8/02; C08G 14/00; C08G 73/10
[52] U.S. Cl. .................. 528/176; 528/125; 528/126; 528/128; 528/172; 528/179; 528/185; 528/188
[58] Field of Search .............. 528/176, 125, 126, 128, 528/172, 179, 185, 188

[56] References Cited

U.S. PATENT DOCUMENTS

| | | | |
|---|---|---|---|
| 3,983,093 | 9/1976 | Williams, III et al. | 528/128 |
| 4,197,396 | 4/1980 | Banucci et al. | 528/125 |
| 4,540,748 | 9/1985 | Matzner et al. | 525/420 |
| 4,623,732 | 11/1986 | Peters | 548/480 |
| 4,675,376 | 6/1987 | Peters | 528/185 |

OTHER PUBLICATIONS

Takekoshi et al., J. Polymer Sci. 23, 1759–1769 (1985).

Primary Examiner—John Kight, III
Assistant Examiner—P. Hampton-Hightower
Attorney, Agent, or Firm—Rothwell, Figg, Ernst & Kurz

[57] ABSTRACT

Polyetherimide resins which crystallize from the melt contain crystallizing repeating units based on biphenol-dianhydride or hydroquinone dianhydride and a linear aromatic diamine. The melt crystalline polyetherimides exhibit improved solvent resistance. The melt crystalline polymers retain the advantageous properties associated with their known amorphous polyetherimide counterparts.

23 Claims, No Drawings

MELT CRYSTALLINE POLYETHERIMIDES

BACKGROUND OF THE INVENTION

The present invention relates to improvements to polyetherimide resins. More particularly, the present invention relates to polyetherimides which are melt crystalline.

The polyetherimides form a now well-known class of engineering thermoplastic polymers. These polymers offer such attributes as high heat resistance, stiffness, impact strength and transparency, high mechanical strength, good electrical properties, high flame resistance, low smoke generation and broad chemical resistance. In addition to these important properties, the polyetherimides exhibit the ease of processability associated with traditional engineering thermoplastics, although in general higher melt temperatures are required.

Polyetherimides are sold by the General Electric Company under the trademark Ultem ®. Polyetherimide resins are of considerable commercial value for use in molding compositions because of the excellent physical, chemical and thermal properties mentioned above. The high glass transition and heat deflection temperatures exhibited by these polymers permit their use in high performance applications. The polyetherimides find applications in the automotive, aerospace and electrical industries, for example.

It is well known and accepted by those skilled in the art that the conventional, commercially available polyetherimides exist in an amorphous state upon solidifying from the melt This is true of the polyetherimide resins commercially available from the General Electric Company under the ULTEM ® trademark including UL-TEM-1000 (a copolymer of bisphenol A dianhydride and meta-phenylene diamine), ULTEM-6000 (a copolymer of bis phenol A dianhydride, pyromellitic dianhydride and meta-phenylene diamine) and ULTEM-5001 (a copolymer of bisphenol A dianhydride and para-phenylene diamine).

Various efforts have been made to improve even further the properties of polyetherimide resins. One approach to such improvements has been to prepare melt crystalline forms of the resins An increased solvent resistance is one example of an improvement that might be achieved by increasing the melt crystallinity of the resins.

Examples of melt crystalline polyetherimides using exotic diamines are described by Takekoshi, et al., in *Journal of Polymer Science*, 74, pp. 93-108 (1986). The use of an exotic diamine, 1,3-bis(4-aminophenoxy)-benzene allowed certain polyetherimides to be melt crystalline and yielded higher solvent resistance to ordinary chemical reagents which are used for industrial purposes The disadvantages of these types of 'exotic diamine' polyetherimides are scarcity and high price of the amines.

It is one object of the present invention to provide melt crystalline polyetherimide resin compositions Another object of the invention is to provide such compositions which retain the ease of synthesis and processing associated with the commercially available amorphous polyetherimide resins. A further object of the invention is to provide melt crystallizable polyetherimide resin compositions having production costs permitting them to become commercially attractive to industry.

SUMMARY OF THE INVENTION

We have now discovered that polyetherimides including repeating units prepared from certain dianhydrides and diamines are highly crystalline in nature. We have also discovered that the substitution of even minor amounts of these crystalline polyetherimide repeating units within the polymer chains of known amorphous polyetherimide resins renders the modified composition crystalline. These crystalline polyetherimide materials exhibit extremely high thermal oxidative stability, heat distortion temperatures as well as extremely high solvent resistance The crystalline polyetherimides retain the processing ease of their amorphous counterparts and are useful as molding compounds and in the preparation of high strength fibers with excellent chemical and heat resistance.

Conventional amorphous polyetherimide resin compositions begin to exhibit heat distortion at or slightly below their respective glass transition temperatures ($T_g$). Heat distortion temperatures of the present compositions advantageously may lie well above their $T_g$s, however. When properly reinforced with glass fiber, carbon fibers or mineral fillers, the heat distortion temperatures of the crystalline compositions could increase and approach their respective melting points ($T_m$). For many compositions of the present invention this translates into about a 60° to 100° C. increase in heat distortion temperature over corresponding amorphous polyetherimide resins.

In one aspect, the present invention relates to melt crystalline polyetherimide resins comprising repeating units based on biphenoldianhydride and a linear aromatic diamine. In another aspect, the present invention relates to melt crystalline polyetherimide resins comprising repeating units based on hydroquinone dianhydride and a linear aromatic diamine. In other aspects, the present invention relates to specific melt crystalline polyetherimide resins comprising one or more of the aforementioned crystallizing repeating units.

DETAILED DESCRIPTION

The polyetherimides have been previously described in the literature as containing repeating groups of the formula

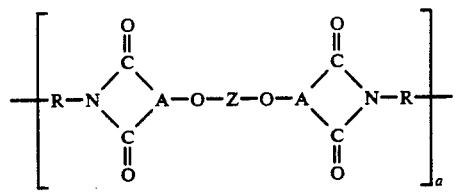

wherein "a" is a whole number greater than 1, e.g., from 10 to 10,000 or more; the group —O—A< is selected from:

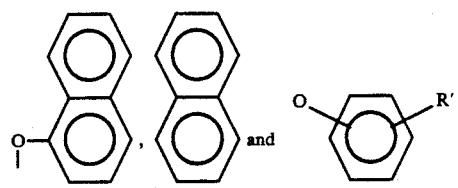

R' being hydrogen, lower alkyl or lower alkoxy, preferably a polyetherimide including the latter —O—A< group where R' is hydrogen such that the polyetherimide is of the formula:

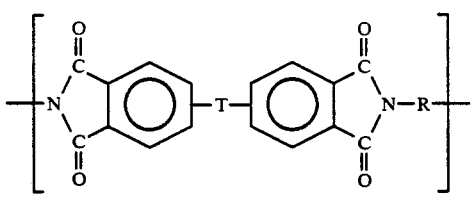

T is —O— or a group of the formula

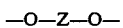

wherein the divalent bonds of the —O— or the —O—Z—O— group are in the 3,3'; 3,4'; 4,3', or the 4,4' position; Z is a member of the class consisting of (A):

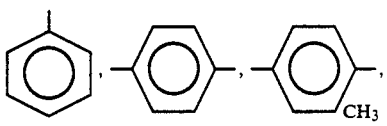

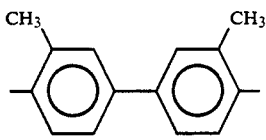

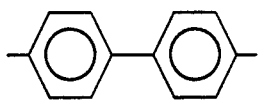

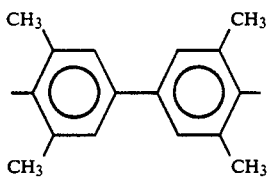

and

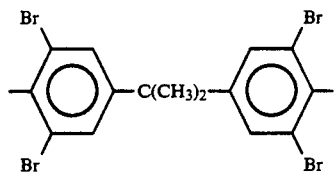

and (B) divalent organic radicals of the general formula

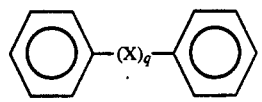

where X is a member selected from the group consisting of divalent radicals of the formulas

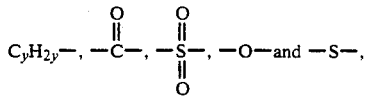

where q is 0 or 1, y is an integer from 1 to about 5; and R is a divalent organic radical selected from the group consisting of (a) aromatic hydrocarbon radicals having from 6 to about 20 carbon atoms and halogenated derivatives thereof, (b) alkylene radicals having from 2 to about 20 carbon atoms, cycloalkylene radicals having from 3 to about 20 carbon atoms, $C_2$ to $C_8$ alkylene-terminated polydiorganosiloxanes and (c) divalent radicals of the general formula

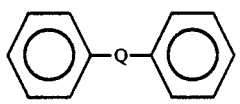

where Q is a member selected from the group consisting of

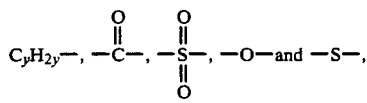

and y is a whole number from 1 to about 5, inclusive.

Included among the many methods of making the polyetherimides are those disclosed in U.S. Pat. Nos. 3,847,867 (Heath et al.), 3,847,869 (Williams), 3,850,885 (Takekoshi et al.), 3,852,242 and 3,855,178 (White) and 4,417,044 (Parekh) and others. These disclosures are incorporated herein in their entirety by reference for the purpose of teaching, by way of illustration, general and specific methods for preparing polyetherimides.

Some of the aromatic bis(ether anhydride)s of formula (I) are shown in U.S. Pat. No. 3,972,902 (Darrell Heath and Joseph Wirth). As described therein, the bis(ether anhydride)s can be prepared by the hydrolysis, followed by dehydration, of the reaction product of a nitrosubstituted phenyl dinitrile with a metal salt of dihydric phenol compound in the presence of a dipolar, aprotic solvent.

Additional aromatic bis(ether anhydride)s also included within formula (I) above are shown by Koton, M.M., Florinski, F.S., Bessonov, M.I. and Rudakov, A.P. (Institute of Heteroorganic Compounds, Academy of Sciences, U.S.S.R), U.S.S.R. patent 257,010, Nov. 11, 1969, Appl. May 3, 1967, and by M. M. Koton, F. S. Florinski, Zh. Org. Khin. 4(5), 774 (1968).

We have now discovered that polyetherimides including even minor amounts of repeating units prepared from biphenoldianhydride (BPDA) and certain linear aromatic diamines, i.e. repeating units of formula:

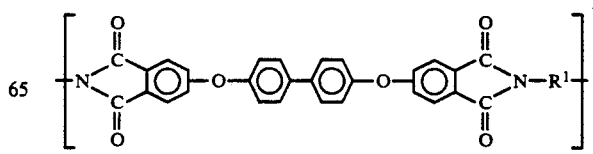

and/or repeating units prepared from hydroquinone dianhydride (HQDA) and certain linear aromatic diamines, i.e. repeating units of formula:

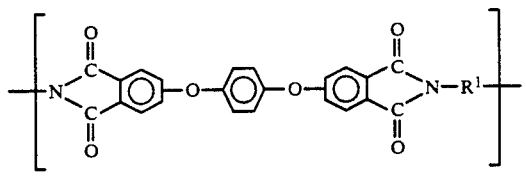

wherein $R^1$ is the residue of a linear aromatic diamine, are melt crystalline and exhibit the improved properties mentioned earlier.

In each of formulas (II) and (III) (referred to herein as crystalline repeating units) the $R^1$ moiety is the residue of a linear aromatic diamine. The term "linear" in this context means that the diamine is incorporated in a linear fashion within the linear polyetherimide chain. Examples of such linear diamines include para-phenylenediamine (pPD), 2,6-diamino-naphthalene and 1,4-diaminonaphthalene. Paraphenylenediamine is preferred.

Homopolymers consisting totally of repeating units of either Formula II or Formula III, while crystalline, have been found to be relatively intractable and infusible materials which are not melt processable. Thus, these homopolymers in and of themselves are not attractive for use in thermoforming processes. The incorporation of as little as five percent (mole percent basis) of one or both of these repeating units into the polymer chains of amorphous melt processible polyetherimide resins, however, renders the modified composition crystalline upon solidifying from the melt, improves solvent resistance and heat deflection, yet does not adversely impact upon the processing ease of the resins. The crystallizing repeating units of Formulas II and III can be incorporated into the polymer chain during synthesis by employing appropriate quantities of BPDA and/or HQDA and linear aromatic diamine(s), or derivatives thereof, in the reaction mixture.

The present invention is not limited to the substitution of these crystalline repeating units within the polymer chains of commercially available amorphous polyetherimide resins. Melt crystalline polyetherimide resin compositions including various other constituents can be prepared via the conventional polymerization processes referenced herein with the proviso that the starting materials be chosen so as to result in a sufficiently high BPDA/linear aromatic diamine and/or HQDA/linear aromatic diamine content in the resin. In this manner a wide variety of melt crystalline polyetherimide resins can be prepared. The relative proportions of the various crystalline repeating units within the polyetherimide polymer chain can be selected via routine experimentation to obtain polymers having a desired degree of crystallinity.

We have found that the incorporation of at least about five percent (mole percent basis) of these crystalline repeating units within the polyetherimide chain is required to impart a degree of crystallinity effective to meaningfully improve the properties of the resin. Preferably about five to 90 percent of these repeating units are incorporated within the polyetherimide chain. As mentioned earlier homopolymers of these subunits are not melt processible, thus the BPDA/linear aromatic diamine and/or HQDA/linear aromatic diamine content of the polymer should not exceed the point where processability is lost. Those skilled in the art can readily determine optimum content on a case by case basis.

It is contemplated that the melt crystalline polyetherimides of the present invention may also include other additive materials such as fillers, stabilizers, plasticizers, flexibilizers, surfactant agents, pigments, dyes, reinforcement, flame retardants and diluents in conventional amounts.

The role of reinforcing agents in the present melt crystalline polymers is especially important when it is desired to obtain maximum heat deflection properties. As is known in connection with other crystalline polymers, heat distortion temperatures exceeding the $T_g$ and approaching the $T_m$ may be obtained by properly reinforcing the polymer matrix. Examples include glass fibers, carbon fibers and mineral fibers.

The following examples illustrate various embodiments of the present invention, but should not be construed as limiting. All percentages are on a mole percent basis and all temperatures are in degrees Celsius unless otherwise stated.

EXAMPLE I

A mixture of 50 grams of 4,4'-bis(2,3-dicarboxy phenoxy) biphenyldianhydride (biphenoldianhydride or BPDA) 2.72g of para-phenylene diamine, 9.10g of meta-phenylene diamine, 0.62g phthalic anhydride, 0.010g sodium phenylphosphinate in 300ml of ortho-dichlorobenzene was heated in a reaction vessel for 3 hours under nitrogen A water collection receiver was used to remove water generated from the reaction The reaction mixture was then allowed to evaporate to dryness to remove all of the solvent. The material was then placed into a Haake Rheochord mixing bowl and heated and mixed over a 10 minute period to 390° C. The material was removed and gave properties as shown in the following tables. Similar procedures were used to make all compositions. Other methods for making polyetherimides are described above.

EXAMPLE II

Highly crystalline all aromatic polyetherimides based on BPDA, pPD and oxydianiline (oDA) were prepared while varying the mole ratio of pPD to oDA in the final polymer product. These materials rapidly crystallized as determined by differential scanning calorimetry. Crystallization rates were similar to those of polyethylene terephthalate (PET) and polybutylene terephthalate (PBT). The crystallization rate of these polymers is rapid enough such that no crystallization appears during subsequent heating after the samples are cooled from compression molding or after controlled cooling from their melts at −40° C./min. Samples quenched from the melt at −320° C./min. show crystallization during subsequent heating. These materials have extremely high thermal oxidative stability as well as extremely high solvent resistance. Temperatures of melting ($T_m$) were observed. The following tables illustrate important properties.

TABLE I

| CRYSTALLINE POLYETHERIMIDES | | | |
|---|---|---|---|
| Composition | | | |
| dianhydride (mole %) | diamine (mole %) | Tg, °C. | Tm, °C. |
| BPA-DA (100) | pPD (100) | 225 | NONE |
| BPA-DA (90)/BPDA (10) | pPD (100) | 225 | 380 |
| BPA-DA (85)/BPDA (15) | pPD (100) | 229 | 381 |

TABLE I-continued
CRYSTALLINE POLYETHERIMIDES

| Composition | | | |
|---|---|---|---|
| dianhydride (mole %) | diamine (mole %) | Tg, °C. | Tm, °C. |
| BPA-DA (80)/BPDA (20) | pPD (100) | 232 | 368 |
| BPA-DA (75)/BPDA (25) | pPD (100) | 233 | 367 |
| BPA-DA (70)/BPDA (30) | pPD (100) | 235 | 388 |
| BPA-DA (65)/BPDA (35) | pPD (100) | 242 | 365 |
| BPA-DA (90)/HQDA (10) | pPD (100) | 229 | 348 |
| BPA-DA (85)/HQDA (15) | pPD (100) | 229 | 349 |
| BPA-DA (80)/HQDA (20) | pPD (100) | 231 | 363 |
| BPA-DA (75)/HQDA (25) | pPD (100) | 232 | 327 |
| BPA-DA (90)/OxyDa (10) | pPD (100) | 228 | NONE |
| BPA-DA (70)/OxyDa (30) | pPD (100) | 234 | NONE |

TABLE II
CRYSTALLINE POLYETHERIMIDES

| Composition | | | |
|---|---|---|---|
| dianhydride (mole %) | diamine (mole %) | Tg, °C. | Tm, °C. |
| BPDA (100) | mPD (100)/pPD (0) | 245 | NONE |
| BPDA (100) | mPD (90)/pPD (10) | 247 | 340 |
| BPDA (100) | mPD (70)/pPD (30) | 250 | 350 |
| BPDA (100) | ODA (100)/pPD (0) | 222 | NONE |
| BPDA (100) | ODA (80)/pPD (20) | 225 | 328 |
| BPDA (100) | ODA (60)/pPD (40) | 230 | 318 |
| BPDA (100) | ODA (40)/pPD (60) | 238 | 338 |
| BPDA (100) | ODA (20)/pPD (80) | 245 | 325 |

Abbreviations:
ODA - aminophenylether;
mPD - meta-phenylene diamine;
OxyDA - 4,4'oxyphthalic anhydride

TABLE III
SOLVENT RESISTANCE OF CRYSTALLINE POLYETHERIMIDES

| Composition | | % weight gain after 24 hour soaking in solvent[a] | |
|---|---|---|---|
| Dianhydride (mole %) | Diamine (mole %) | Methylene Chloride | Chloroform |
| BPA-DA (100) | pPD (100) | decomp.[b] | decomp. |
| BPA-DA (90)/BPDA (10) | pPD (100) | 104 | decomp. |
| BPA-DA (85)/BPDA (15) | pPD (100) | 86 | 22 |
| BPA-DA (80)/BPDA (20) | pPD (100) | 77 | 1.8 |
| BPA-DA (75)/BPDA (25) | pPD (100) | 64 | 0.4 |
| BPA-DA (90)/HQDA (10) | pPD (100) | 92 | 36 |
| BPA-DA (85)/HQDA (15) | pPD (100) | 79 | 2.8 |
| BPA-DA (80)/HQDA (20) | pPD (100) | 63 | 0.4 |
| BPA-DA (75)/HQDA (25) | pPD (100) | 20 | 0.2 |
| BPA-DA (90)/OxyDa (10) | pPD (100) | 106 | decomp. |
| BPA-DA (80)/OxyDa (20) | pPD (100) | 113 | 274 |
| BPA-DA (70)/OxyDa (30) | pPD (100) | 103 | 41 |
| BPA-DA (60)/OxyDa (40) | pPD (100) | 38 | 0.2 |
| Dianhydride (mole %) | Diamine (mole %) | Methylene Chloride | Chloroform |
| BPDA (100) | mPD (100) | 5.7 | — |
| BPDA (100) | mPD (90)/pPD (10) | 1.5 | — |
| BPDA (100) | mPD (80)/pPD (20) | 1.1 | — |
| BPDA (100) | mPD (70)/pPD (30) | 0.8 | — |
| BPDA (100) | SDAN[c] (100) | 10.2 | — |
| BPDA (100) | SDAN (90)/pPD (10) | 6.6 | — |
| BPDA (100) | SDAN (80)/pPD (20) | 2.7 | — |
| BPDA (100) | SDAN (70)/pPD (30) | 1.6 | — |
| BPDA (100) | ODA (100) | 65 | — |
| BPDA (100) | ODA (90)/pPD (10) | 1.3 | — |
| BPDA (100) | ODA (70)/pPD (30) | 0.5 | — | a - samples were 1" × 1" × 1/32".
b - sample physically decomposed into powder prior to completion of 24 hour test.
c - SDAN represents 4,4' aminophenylsulfone.

We claim:

1. A polyetherimide comprising a sufficient mole percentage of units of formula

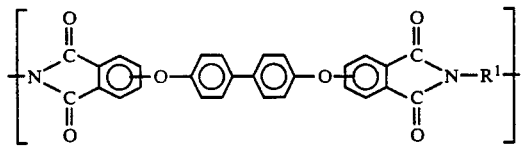

wherein $R^1$ is a residue of a linear aromatic diamine to render said polyetherimide melt crystalline.

2. A polyetherimide of claim 1 wherein $R^1$ is a residue of para-phenylenediamine, 2,6-diaminona-phthalene or 1,4-diaminonap-hthalene.

3. A polyetherimide of claim 1 wherein $R^1$ is a residue of para-phenylenediamine.

4. A polyetherimide of claim 1 wherein said mole percentage is at least about 5.

5. A polyetherimide comprising a sufficient mole percentage of units of formula

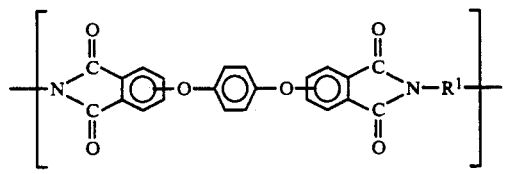

wherein $R^1$ is a residue of a linear aromatic diamine to render said polyetherimide melt crystalline.

6. A polyetherimide of claim 5 wherein $R^1$ is a residue of para-phenylenediamine, 2,6-diaminonaphthalene or 1,4-diaminonaphthalene.

7. A polyetherimide of claim 5 wherein $R^1$ is a residue of para-phenylenediamine.

8. A polyetherimide of claim 5 wherein said mole percentage is at least about 5.

9. A melt crystalline polyetherimide resin comprising, on a mole percent basis, at least about 5 percent of repeating units of formula

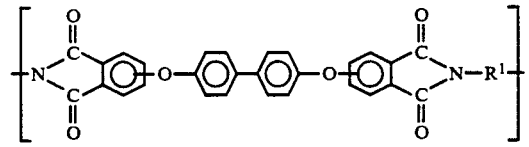

wherein R1 is a residue of a linear aromatic diamine.

10. A polyetherimide of claim 9 wherein $R^1$ is a residue of para-phenylenediamine, 2,6-diaminonaphthalene or 1,4-diaminonaphthalene.

11. A polyetherimide of claim 9 wherein $R^1$ is a residue of para-phenylenediamine.

12. A melt crystalline polyetherimide resin comprising, on a mole percent basis, at least about 5 percent of repeating units of formula

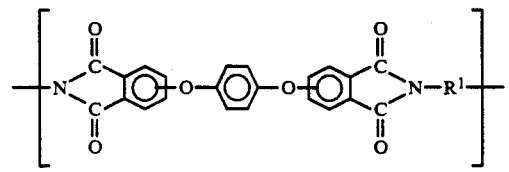

wherein R1 is a residue of a linear aromatic diamine.

13. A polyetherimide of claim 12 wherein R¹ is a residue of para-phenylenediamine, 2,6-diaminonaphthalene or 1,4-diaminonaphthalene.

14. A polyetherimide of claim 12 wherein R¹ is a residue of para-phenylenediamine.

15. A melt crystalline polyetherimide of formula [A]x[B]y wherein A is of formula

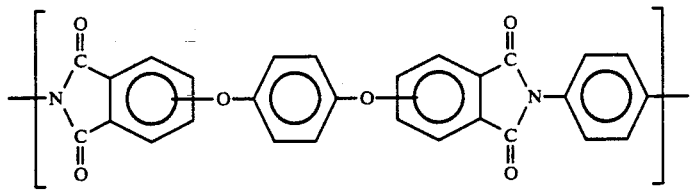

and B is of formula

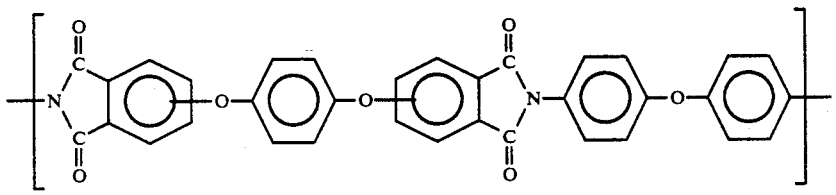

wherein x and y, independently, are integers of at least 1.

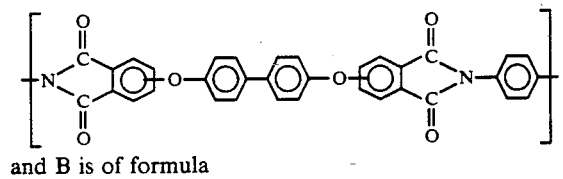

16. A copolymer of claim 15 wherein the molar ratio A:B from about 80:20 to 20:80.

17. A copolymer of claim 15 wherein x is an integer of from about 1 to about 40.

18. A copolymer of claim 17 wherein y is an integer of from about 1 to about 40.

19. A melt crystalline polyetherimide of formula [A]x [B]y wherein A is of formula

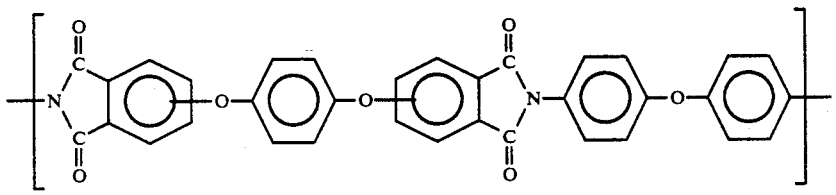

and B is of formula

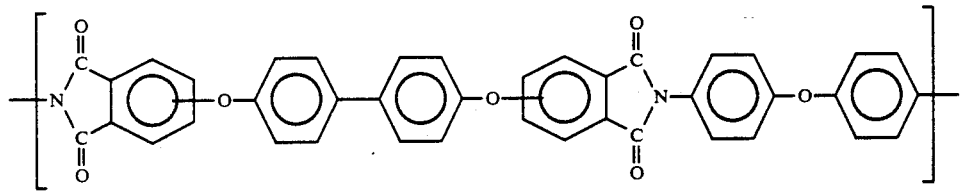

wherein x and y, independently, are integers of at least 1.

20. A copolymer of claim 19 wherein the molar ratio A:B is from about 40:1 to about 1:40.

21. A copolymer of claim 19 wherein x is an integer of from about 1 to about 40.

22. A copolymer of claim 19 wherein y is an integer of from about 1 to 40.

23. A melt crystalline polyetherimide resin of formula ]A]x [B]y wherein A units are of formula

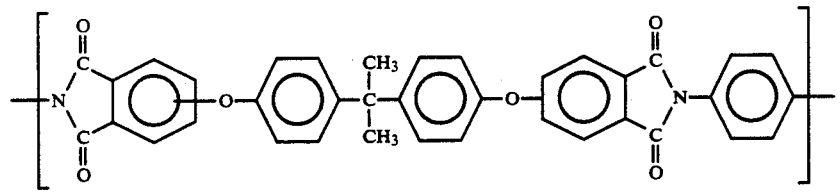

and B units are of formula

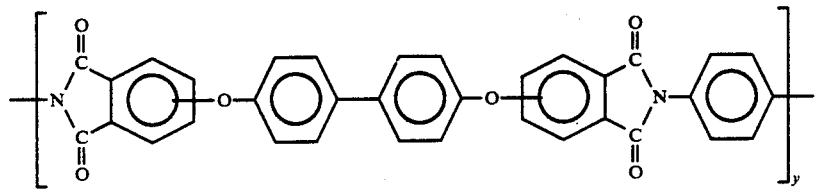

wherein the molar ratio A:B is at least (1:40).

* * * * *